G. H. TREADGOLD.
WHEEL.
APPLICATION FILED DEC. 10, 1906.

937,973.

Patented Oct. 26, 1909.
2 SHEETS—SHEET 1.

WITNESSES:

INVENTOR
GEORGE H. TREADGOLD
BY
ATTORNEY

G. H. TREADGOLD.
WHEEL.
APPLICATION FILED DEC. 10, 1906.

937,973.

Patented Oct. 26, 1909.
2 SHEETS—SHEET 2.

WITNESSES:

INVENTOR
GEORGE H. TREADGOLD
BY
Clement R. Stickney
ATTORNEY

UNITED STATES PATENT OFFICE.

GEORGE H. TREADGOLD, OF PORT HURON, MICHIGAN.

WHEEL.

937,973.  Specification of Letters Patent.  Patented Oct. 26, 1909.

Application filed December 10, 1906. Serial No. 347,105.

*To all whom it may concern:*

Be it known that I, GEORGE H. TREADGOLD, a citizen of the United States of America, residing in the city of Port Huron, county of St. Clair, and State of Michigan, have invented certain new and useful Improvements in Wheels, of which the following is a full, clear, and exact specification.

In resilient or pneumatic wheels of the type wherein the spring effect is obtained at some point or place within and apart from the wheel tire, it is usually necessary, in case a pneumatic tube or chamber is used, to have the walls of the chamber in contact with the separably movable metallic or rigid members of the wheel, and so connected thereto as to form in themselves a flexible driving connection between the parts. Even where the pneumatic chamber does not form a driving connection, the walls are subject to friction against the surrounding and containing members. In wheels wherein the resiliency is obtained by the use of spring members alone, the violent reactions of the members and recoil against the traction members, in case the wheel is applied to a motor vehicle, greatly lessen their efficiency.

This invention relates to a wheel wherein the ruder shock is taken up by spring members or the like, whose recoil is absorbed and reduced by a pneumatic tube or shell, which does not in any way transmit the driving or traction strain from one part to another, whose inflated chamber is not in contact with moving or vibrating parts of the wheel, which is readily replaced, and is not liable to wear from any movement save the usual compressions and expansions to which it is subjected.

The invention consists in the matters hereinafter set forth, and more particularly pointed out in the appended claims.

Figure 1:
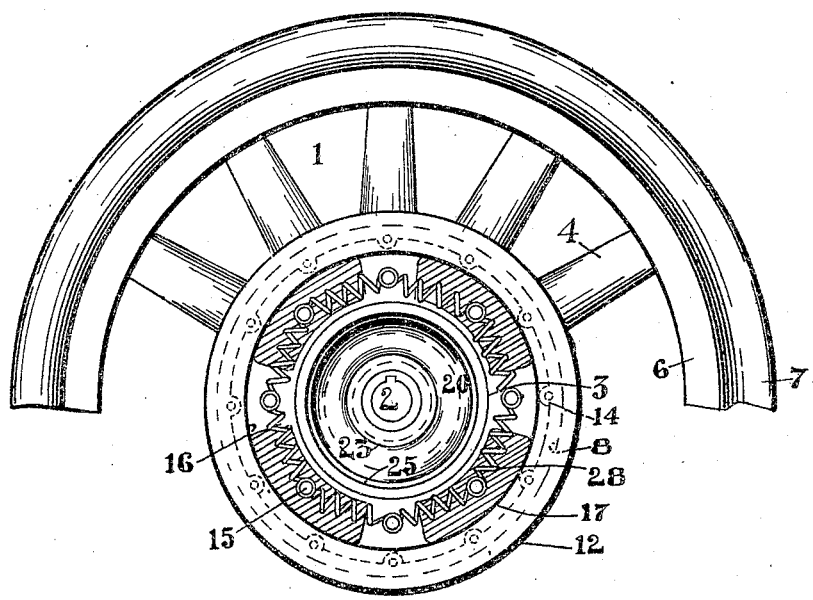
Figure 2:
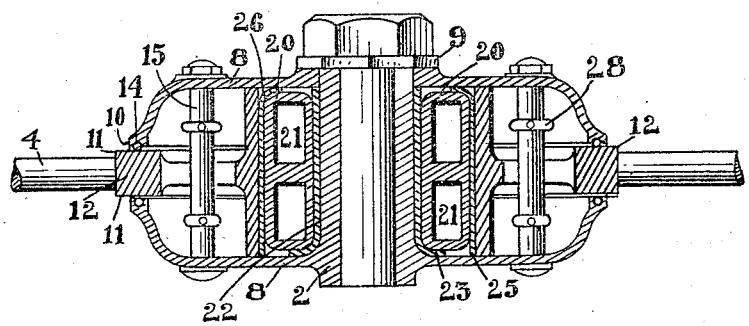
Figure 3:
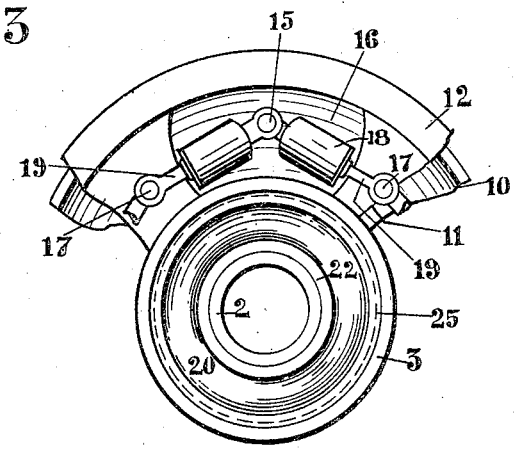
Figure 4:
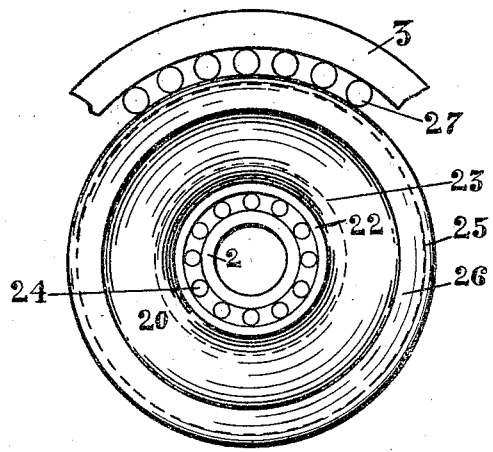

In the drawings, Figure 1 is a view in side elevation, with a retaining flange removed, of a wheel embodying the features of the invention. Fig. 2 is a view in section through the wheel, part of the spring members being omitted to give clear view, and the drawing being on a larger scale. Fig. 3 is a view in detail of a wheel having another form of shock absorbing and traction transmitting member. Fig. 4 is a detail, enlarged, of a pneumatic shell adapted for a wheel with friction bearings.

Referring to the drawings, 1 represents a resilient wheel of any preferred type, wherein there is an inner fixed hub 2, an outer spoke hub 3, provided with spokes 4, or the corresponding web, felly 6 and tire 7, of solid rubber or metal, as desired. Said inner and outer hubs are held in lateral alinement by suitable means, as for instance, the engagement of the ends of the outer hub with flanges 8 on the fixed hub, one of which is adjustably secured as by a jam-nut 9 to take up wear, said flanges 8 also extending over the outer hub, and engaging at their peripheral margins 10 with the sides 11 of a centrally disposed flange or rib 12 of the fixed hub, balls 14 being inserted if desired, to reduce the friction. Said inner and outer hubs are connected by opposed resilient members which, while permitting free oscillations of the parts in reference to each other, limit their relative rotative movements, and are constructed to transmit the traction power applied, from one hub to the other. These members may be a set of tangentially disposed spiral springs 28 secured to the outer flanges at appropriate points, as, for example, by bolts 15 passing through the flanges, and through enlarged apertures 16 in the central rib of the movable hub, and to the movable hub as by engaging pins or studs 17 in the central rib 12 thereof. Or the said connecting members may be in the form of pneumatic dash-pots or cylinders 18, pivoted at their corresponding ends in pairs to the studs 17 of said central rib 12, provided with plungers or pistons, whose stems 19 are likewise coupled in pairs to the bolts 15 of the outer flanges, the pistons working in approximately tangential lines around the hub, and the cylinders being preferably closed at both ends to double the pneumatic effect. The two hubs of the wheel, which as above described are thus yieldingly connected to transmit the traction strain from one to the other, while the above forms are preferred, may be of any effective design, which provides an annular space of some size between the fixed and floating hub.

A pneumatic shell or cartridge is inserted between said hubs. This comprises an inner tube 20 of rubber (or any resilient member) which has one or more air-spaces or chambers 21, and may be permanently inflated or provided with the usual connections for inflation. Said inner tube is adapted to tightly encircle an inner shield 22 of thin sheet metal or the like, one of whose ends is provided with an annular flange 23, which partially covers one end wall of the said tube. Said inner shield is adapted to rotate on the fixed inner hub 2, and roller bearings 24 may be provided if desired. The outer face of the tube 20 is protected by an outer shield 25, of thin sheet metal or the like, one of whose ends opposite to the flange 23 of the inner shield 22, is interiorly flanged, the resultant rim 26 partially encircling and protecting the end of the tube. Said shield 25 is adapted to rotate freely within the outer hub 3, and may have roller bearings 27 inserted, if desired. Said shields 22 and 25 are adapted to bear at their end margins, against the containing flanges or equivalent parts of the containing wheel, and the inner tube is so proportioned that it does not come in contact in any way with the oscillating walls of the surrounding and central hub.

In operation, the parts are so adjusted and disposed that the traction strain is transmitted through the resilient connections from hub to rim or the reverse, and the shocks of the road are met by the movement and recoil of the springs. Owing, however, to the presence of the pneumatic shell, which is free from any torsional effect or driving strain, the rebound of the parts is met by the counter oscillations of the hubs on the pneumatic tube, which in a measure offset and modify the movements, after the manner of compound springs of different periods of vibrations in a railway truck.

The metal walls of the shell are the only parts in wearing contact with the oscillating hubs, and the walls of the tube are relieved of all traction or torsion strain. The shell may be readily removed, as the rubber does not grip the wheel proper, and in case of wear, the shields may be replaced at small expense.

Obviously, the parts may be designed to meet special requirements of service without departing from the spirit of the invention, and I do not limit myself to any particular form or arrangement of parts except as set forth in certain of the appended claims.

I claim as my invention:—

1. A pneumatic shell for a resilient wheel, comprising an inflated annular chamber, having an outer metal shield adapted to rotatably engage the wheel hub, and an inner metallic shield adapted to rotatably engage the inner hub, said shields being flanged at their ends to retain the chamber and engage the wheel hub.

2. In a resilient wheel having an inner hub, an outer hub normally concentric therewith, connections yieldingly transmitting torsional strain from one hub to the other, and members defining the lateral relations of the hubs, a pneumatic shell comprising an inner, cylindrical metal shield journaled on the inner hub, an outer metal shield journaled in the outer hub, said shields being held in alinement by the said defining members of the wheel, and an inflated annular chamber secured between the shields.

3. In a resilient wheel having an inner hub, an outer hub, flanges maintaining the hubs in operative relation, and yielding connections between the hubs transmitting torsional strain from one hub to the other, defining their relative angular displacement, a pneumatic shell comprising an inner metal shield journaled on the inner hub, provided with an annular retaining flange, an annular inflated chamber gripping the inner shield, and an outer metal shield secured on the outer periphery of the chamber, journaled in the outer hub, provided with an end retaining flange, said shields having endwise engagement with the wheel hub flanges.

4. In a resilient wheel, an inner hub, an outer hub normally concentric therewith, flanges on the hubs having sliding engagement with each other, yielding connections between the hubs adapted to transmit torsional strain from one hub to the other, an annular inflated chamber between the hubs, a metal cylinder journaled on the inner hub engaging the chamber aperture, and an outer metal cylinder surrounding the periphery of the annular chamber journaled in the outer hub, said cylinders having sliding engagement along their end faces with the hub flanges.

5. In a resilient wheel, an inner hub having annular, outwardly disposed, adjustably secured end flanges, an outer hub encircling the inner hub, having an annular rib, said outer hub and rib bearing on either face against the inner faces of the end flanges, opposed yielding connections tangentially disposed around the hubs, operatively connecting the said flanges and rib, a cylinder journaled on the inner hub, between the flanges, provided with an inturned annular flange at one end, an outer cylinder journaled in the outer hub, provided with an inturned annular flange at the end opposite to the annular flange of the inner cylinder, and an inflated annular tube gripping the inner cylinder and compressed by the outer cylinder, retained laterally by the oppositely disposed annular flanges of said cylinders.

In testimony whereof, I have hereunto signed my name in the presence of the subscribing witnesses.

GEORGE H. TREADGOLD.

Witnesses:
C. RICKILIEUS STICKNEY,
J. VAN LIEW.